May 18, 1937. F. J. LEYNER Re. 20,371

ICE TRAY

Original Filed Aug. 27, 1932

Inventor

Frank J. Leyner.

By A. J. O'Brien

Attorney

Reissued May 18, 1937 Re. 20,371

UNITED STATES PATENT OFFICE 20,371

ICE TRAY

Frank J. Leyner, Lafayette, Colo., assignor to A. Yates Dowell

Original No. 1,935,405, dated November 14, 1933, Serial No. 630,640, August 27, 1932. Application for reissue November 13, 1935, Serial No. 49,646

10 Claims. (Cl. 62—108.5)

This invention relates to improvements in ice trays of the type employed in connection with mechanical refrigerators for the purpose of freezing ice cubes.

Since the adoption of mechanical refrigeration on a large scale for household use, the necessity of having some convenient way for freezing ice for use in preparing ice water and for other purposes, has been recognized and practically every mechanical refrigerator is provided with some form of tray that can be filled with water and inserted into a compartment in the freezing unit, where the water will be subjected to such low temperature that it will congeal. Since water wets the surface of metal, it will naturally adhere to the metal when frozen and it is therefore very difficult to remove the ice from the compartments of metal trays. The difficulty just mentioned has been recognized and many attempts have been made to overcome it by changing the design of the trays or by making the trays of material whose surface is not appreciably wetted by the water and to which, therefore the ice does not readily adhere.

As an example of the class of trays just mentioned, attention is called to a type of trays made from rubber which can be employed in a manner analogous to the metal trays, but from which the ice cubes can be removed by bending the tray or distorting it in such a way that the sides of the ice are loosened from the sides of the compartments.

It is the object of this invention to produce a tray that shall be especially well adapted for use in freezing water to form ice cubes and whose construction makes it possible to release the ice cubes easily and quickly and without injury to the tray.

This invention, briefly described, consists of a tray having a bottom formed from a thin, resilient, flexible sheet of metal, to one surface of which is secured by vulcanization, a mold having a plurality of compartments whose sides are formed from rubber and which are extensible to some extent.

In normal position the bottom of the tray is straight so as to form a plain surface, but after the ice has been formed, the tray can be bent into such shape that the bottom is convex upwardly, thereby releasing the ice cubes from the upper surface of the bottom and from the sides of the mold.

Having thus briefly described the invention, the same will now be described in detail, and for this purpose reference will be had to the accompanying drawing in which the preferred embodiment thereof has been illustrated, and in which.

Figure 1:
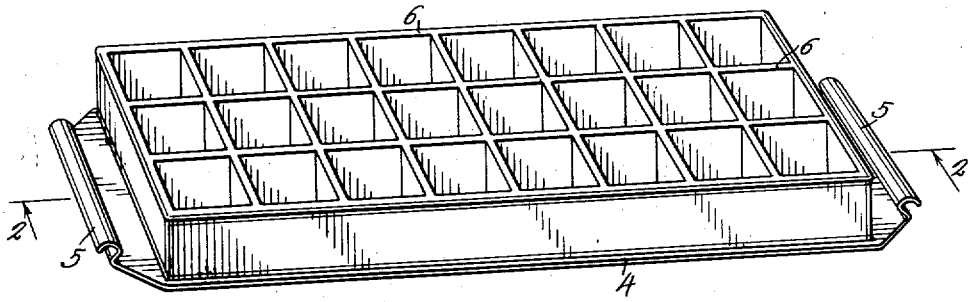
Fig. 1 is a perspective view of a tray made in accordance with this invention.
Figure 2:
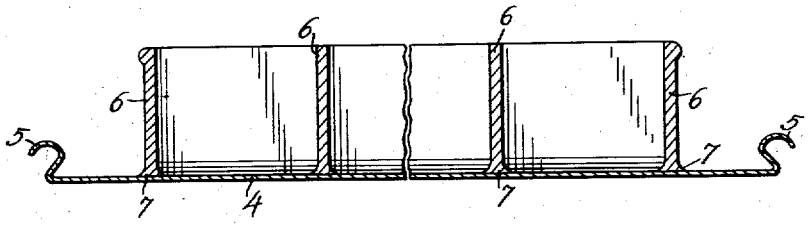
Fig. 2 is a longitudinal section taken on line 2—2, Fig. 1, a portion of the tray having been removed so as to shorten the figure.
Figure 3:
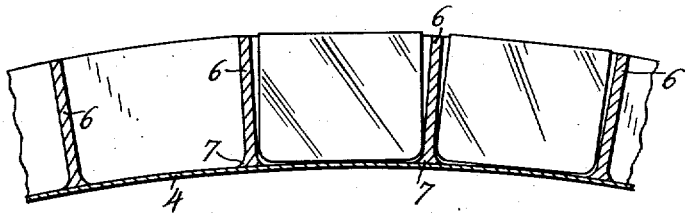
Fig. 3 is a section taken on line 2—2, Fig. 1, and shows the bottom curved for the purpose of releasing the ice cubes.

In the drawing reference numeral 4 designates the bottom of the tray which is formed from a thin sheet of metal, such as steel, which is readily bendable and which has sufficient resiliency to return it to original position when released. The ends of the bottom are provided with handle portions 5 for convenience in inserting and removing the tray and for handling it. Secured to the upper surface of the bottom is a mold that is formed from rubber composition. In the example shown, the mold has twenty-four openings or compartments that are formed, eight in length and three in width. The number of compartments, as well as their size, can be changed to suit the conditions. The mold is provided with vertical sides and partitions which have been designated by reference numeral 6. These partitions may be of any suitable thickness and width and the entire mold portion is formed in one unit. The lower edges of the partitions and sides 6 are attached to the upper surface of the bottom 4 by being vulcanized thereto as indicated at 7 in Figs. 2 and 3. The method of vulcanizing rubber to metal is well known and forms no part of this invention. After the mold has been formed and attached to the upper surface of the bottom, the assembly has the appearance shown in Fig. 1 and a section like that shown in Figs. 2 and 3. When ice is to be frozen, the several compartments are filled with water and the tray is then introduced into an opening provided therefor in the freezing unit of the refrigerator. After the water has frozen, the tray can be removed and the bottom bent upwardly as shown in Fig. 3. Since the ice cubes will not bend, it is apparent that there will be a force produced that tends to separate the bottoms of the ice cubes from the upper surface of the metal bottom, thereby releasing the ice. The upward arching of the tray also tends to lengthen the sides of the compartments and thereby producing forces that separate the ice from the sides of the compartments. After the ice has been released, the tray will return to its original position by simply releasing the force that is used for bending the same.

I am of course aware that the trays made entirely of rubber can be bent, but with such trays there is practically no force produced that tends to separate the bottoms of the ice cubes from the upper surface of the bottom of the compartments, because the entire tray is made of flexible rubber and therefore the flexure will take place at points between the ice cubes, whereas when a metal bottom is employed, a gradual curvature like that shown in Fig. 3 will tend to separate the ice from the bottom. Another advantage of a metal bottom over a rubber one is that it is a better conductor of heat and cold, and therefore the heat in the water will be more quickly abstracted than when a rubber tray is used and this results in a quicker freezing of the water.

Another advantage of the metal bottom is that it can have sufficient rigidity to support the tray without bending when the compartments are filled with water and this simplifies the handling of the tray.

With a tray like that shown and described and which has a sheet metal bottom that is a very good conductor of heat, it is apparent that as soon as the tray is removed from the refrigerator into a room of normal temperature, the heat surrounding the tray will pass through the bottom very quickly and serve to loosen the ice from the upper surface of the bottom. If the ice must be removed very quickly, its removal can be facilitated by dipping the bottom of the tray into warm water, or holding it, for a few seconds, over the flame of a gas stove, or in other ways subjecting it to a high degree of heat for a short period, as by this means the bond between the ice and the metal is entirely dissolved, thereby facilitating the release of the ice. Although the heating of the bottom is sometimes desirable, it is not absolutely necessary, as the mechanical force applied by the bending of the bottom is sufficient to release the ice cubes. When the term "cube" is employed, it is intended to cover any ordinary shape of ice, whether it is absolutely cubical or rectangular in shape.

What I claim is:

1. A tray for use in freezing water to form ice cubes of predetermined size and shape comprising, a flexible metal plate forming a bottom, and a mold having a plurality of openings whose walls are formed from rubber, one side of the mold being united with the metal bottom by a water tight joint.

2. A tray for use in freezing water to form ice cubes of predetermined size and shape, comprising a multiple compartment mold whose sides and partition walls are formed from rubber and whose bottom is formed entirely from a piece of resilient bendable sheet metal to one surface of which the rubber sides are vulcanized.

3. Ice cube apparatus including a resilient body member and uprights thereon all of resilient material, said body member having one or more extensions for application of distorting force, said bottom and uprights forming a grid structure having stretchable upper edges.

4. Forming apparatus for matter to be refrigerated including intersecting upright flexible walls and a metal member underlying said walls, said walls defining spaces open at the top and closed at the bottom by said metal member and providing compartments for matter to be refrigerated by transmission of heat through said metal member, said metal member being manipulatable to release the matter after refrigeration thereof.

5. Ice forming apparatus comprising distortable partition structure and an underlying metal member, said partition structure being open at the top and being closed at the bottom by said metal member, said metal member being constructed to be manipulated for facilitating removal of the apparatus from a support and for distorting the partition structure for freeing ice therefrom.

6. Forming apparatus for material to be refrigerated including a resilient metallic bottom member adapted to be bowed, longitudinal and transverse wall parts mounted thereon so constructed and arranged as to allow flaring of the wall parts on bowing of the bottom member, and outwardly extending handle means at the ends of the bottom member for distorting the bottom member, said bottom member and said wall parts forming containing means for liquid to be refrigerated.

7. Forming apparatus for matter to be refrigerated comprising a flexible sheet of good heat conducting properties, and wall structure on said sheet united thereto by a liquid tight joint, said wall structure and sheet forming a liquid tight receptacle for matter to be refrigerated, the sheet forming the bottom of the receptacle and the wall structure forming lateral confining means, the construction providing for the flexing of the sheet to break an ice bond between the receptacle and a member to which the same may be frozen.

8. An ice tray comprising a bottom member formed of a strip of thin flexible material of good heat conducting properties, upright wall structure attached to said bottom member and forming with said bottom member liquid containing means for matter to be refrigerated, said bottom member being extended beyond said upright wall structure to form means for facilitating the removal of the tray from its support and for freeing matter from the tray.

9. A receptacle for matter to be refrigerated comprising a flexible metal sheet and distortable upright compartment defining wall structure united to the sheet in a manner to provide independent water tight cells.

10. An ice tray consisting of a bottom of good heat conducting material and wall structure on said bottom and providing therewith retaining means for liquid, said tray being constructed in a manner such that the bottom may be grasped and flexed to release the tray from a support and thereafter flexed to eject ice from the tray.

FRANK J. LEYNER.